JUSTIFICATION OF OPERANDS IN AN ARITHMETIC UNIT

Filed Feb. 28, 1966 3 Sheets-Sheet 1

INVENTORS
WALTER R. LETHIN
NICHOLAS A. PAPANTONIS
JOHN J. BRADLEY
BY Robert J. Zinn
ATTORNEY Oct. 10, 1967 W. R. LETHIN ET AL 3,346,727

JUSTIFICATION OF OPERANDS IN AN ARITHMETIC UNIT

Filed Feb. 28, 1966 3 Sheets-Sheet 3

3,346,727
Patented Oct. 10, 1967

3,346,727

JUSTIFICATION OF OPERANDS IN AN ARITHMETIC UNIT

Walter R. Lethin, Canton, Nicholas A. Papantonis, Lexington, and John J. Bradley, Framingham, Mass., assignors to Honeywell Inc., Minneapolis, Minn., a corporation of Delaware Filed Feb. 28, 1966, Ser. No. 530,302
7 Claims. (Cl. 235—160)

ABSTRACT OF THE DISCLOSURE

Apparatus for "justifying" corresponding orders of digits of two operands preparatory to the initiation of a division operation by over-and-over subtraction wherein control means, associated with an addressable memory, and initially including information concerning the memory address of the divisor and dividend operands is used to reference memory locations of the divisor. Scanning means are provided to sense the contents of the memory locations so referenced as to ascertain the number of digits comprising the divisor whereafter the information in the control means defining the memory address of the dividend operand in the addressable memory is modified by a number corresponding to the number of digits ascertained as comprising the divisor.

The present invention is directed to an electronic data processing apparatus and in particular relates to means for justifying the operands to be used in the arithmetic portions thereof. More specifically, an apparatus is disclosed whereby two fixed point operands to be used in a division operation are justified while still in memory thus enabling the division operation to be effected with maximum efficiency.

It is well known that division can be performed by repeatedly subtracting the divisor from the dividend and tallying the number of subtractions which are accomplished. This technique is generally known as division by over-and-over subtraction. Each time the divisor is subtracted from the dividend, a one is added into the appropriate order of the quotient. After a number of such subtractions, the remainder is less than the divisor. It thus becomes necessary to shift the dividend with respect to the divisor, or vice versa.

In effecting the division operation in a character-oriented system, certain difficulties often arise. Included among these is the question of the proper order of the dividend from which the divisor is to be subtracted the first time. It is possible to start the division process with the lowest order divisor digit lined up with the highest order dividend digit regardless of the values of any of the individual digits. However, this process consumes an excessive amount of time since in both instances, a large number of zeros will be obtained before the first non-zero quotient digit is generated. In addition to the obvious inefficient use of time, additional complications may arise from the inefficient utilization of the spaces provided for the storage of the quotient.

Accordingly, it is a primary object of the present invention to provide means for justifying the divisor and dividend preliminary to their extraction from memory so as to insure the success of the first attempt at subtraction.

As hereinafter referred to, an attempted subtraction is deemed to be "successful" if the result is of the same sign as the partial remainder; while it is deemed to be "unsuccessful" if a change of sign occurs.

A preferred embodiment of the present invention takes the form of a character processor in which each four bit binary coded decimal digit is accommodated in the low order four bits of the six information bits available to each character. The preferred embodiment of the present invention is further disclosed as being operative in conjunction with a two address-field instruction format, the two address-fields being hereinafter referred to as the A and B fields. The A field is of variable length and is used to define the main memory addresses of the digits comprising the divisor. As such, the A field comprises a plurality of characters equal in number to the number of digits representing the divisor. The limits of the A field are defined by particular punctuation; this punctuation is referred to hereinafter as a word mark, and is used to define the high order digit of an operand. A special bit combination denoted as zone bits are used to identify the low order digit of an operand. In addition to defining the lower limit, the zone bits are also used to define the sign of the operand. The B field in addition to accommodating the respective digits of the dividend, also provides space for storing off the quotient digits as they are generated. The additional spaces required to accommodate the quotient digits are equal in number to the number of digits comprising the divisor plus one additional separator space which maintains the quotient digits separate from the remainder. Additional space for storing quotient digits is generated in the area of the B field originally allocated to storage of the dividend as the latter is diminished in the course of the division operation.

In a character-oriented system, arithmetic operations are performed by extracting corresponding digits of a first and second operand and, after effecting the desired arithmetic operation therewith, restoring the resultant partial value pending the execution of similar arithmetic operations on the remaining digits. The amount of time it takes to effect a logical or arithmetic operation on a pair of digits is measured in terms of memory cycles. A memory cycle is defined as the time required to read out a main memory location, store its contents in a register, and write the information back into the memory location where it originated. A memory cycle is in turn composed of four subintervals, each of which corresponds to a control memory cycle. The first of the memory cycle subintervals is used to obtain the control memory address of the main memory location to be referenced while the other three subintervals may be used to store information in the control memory for later use. Assuming that it takes a single memory cycle to extract each of the digits of the operands, and an additional memory cycle to effect an arithmetic operation thereof, it becomes readily apparent that an inordinate amount of time may be spent in aligning the divisor and dividend prelimary to the first "successful" subtraction.

In accordance with the teaching of the present invention, means are provided to scan the A field so as to ascertain the number of digits comprising the divisor. The scanning of the A field is effected prior to the extraction from memory of the operands for the purpose of effecting the actual arithmetic manipulations thereof. More specifically, means are provided to initiate a scanning of the A field commencing with the recognition of the sign bits associated with the low order digital position thereof. As each digit of the A field is scanned, means are provided to detect the presence of the defining punctuation identifying a particular digit as the most significant digit of the divisor. In the cycle subsequent to the scanning of each digit of the A field, there occurs a similar scanning of the contents of the B field beginning with the high order digit of the dividend. The digits of the B field are scanned in order of decreasing significance and in this cycle it is the detection of the zone bit, i.e. the configuration indicative of the sign of the B operand, which is being sensed for. In this respect the detection of the sign bits in the B field prior to the detection of the word mark in the A field indicates that the number of significant digits of the dividend are less than that of the divisor and consequently that the quotient resulting from the division operation is fractional. In the preferred embodiment of the present invention, once it is established that the divisor is of greater magnitude than the dividend, further efforts to effect the division operation are curtailed.

Each digit of the A and B operands is stored in a separate addressable memory location. Preparatory to the scanning of each digit, the main memory address thereof is registered in respective counters of a control portion of the associated data processing system. Each digit of the A operand, commencing with the lower order digit thereof, is first scanned for punctuation defining the digit as the most significant digit of the operand. As each digit of the A operand is scanned, the contents of a counter in control memory defining the main memory location of this particular digit are incremented and restored thereto preparatory to the scanning of the next higher order digit. Before commencing the scanning of the succeeding digit of the A operand, the high order digit of the B operand as defined by a second counter in control memory is scanned and the contents of the second counter are decremented and restored in a similar manner. After the first digit of the B operand has been scanned to insure that the length of the B operand exceeds that of the A operand, the next highest order digit of the A operand is scanned; whereafter alternate sensing and incrementing of the A and then the B counter is continued in the manner indicated above.

This process continues until the most significant digit of the A operand has been identified at which time the contents of the second or B counter specify the digital position of the dividend corresponding to the low order digit of the divisor. The first or A counter is restored to its original representation to thus identify the main memory location of the lowest order digit of the divisor, while the B counter remains in its incremented state to identify the main memory location of the first of the characters to be subtracted. Once in this condition, the arithmetic unit is ready to initiate the division operation by the method of over-and-over subtraction.

Accordingly, another more specific object of the present invention is to provide a new and improved data processing apparatus incorporating counting means associated with the respective digits of two operands undergoing arithmetic manipulation, and to increment the counting means corresponding to one of the operands in accordance with the sensing of the respective digits thereof, while decrementing the counting means associated with the other operand so as to insure the alignment of corresponding orders of the digits of the respective operands preliminary to the initiation of the arithmetic operation thereon.

The foregoing objects and features of novelty which characterize the present invention, as well as other objects of the present invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the present invention.

Figure 1:
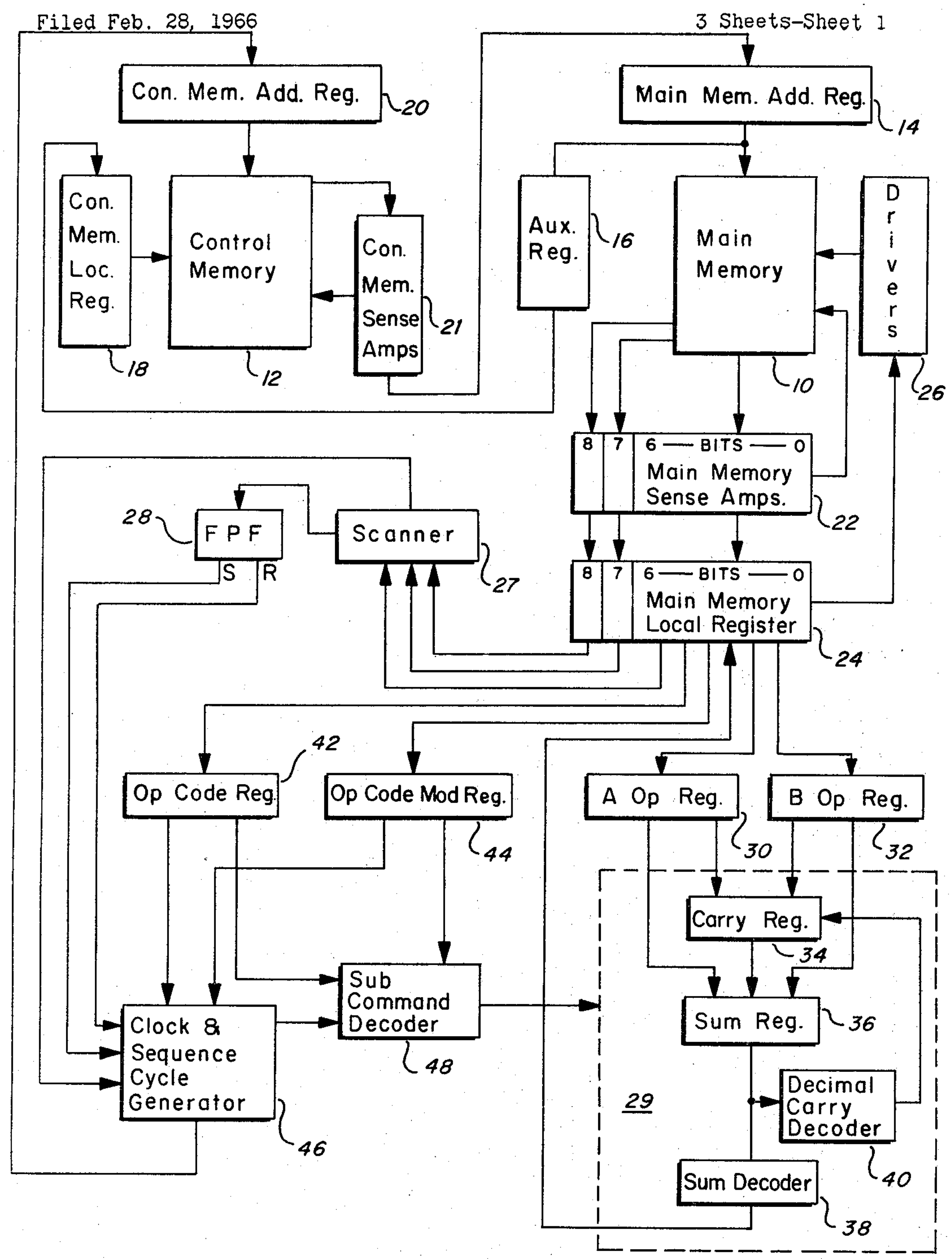
FIGURE 1 is a diagrammatical representation of a data processing apparatus incorporating the principles of the present invention.

Referring first to FIGURE 1, therein is shown a portion of an electronic data processing apparatus constructed in accordance with the principles of the present invention and which comprises a central processor including a memory portion 10. The memory portion 10 may comprise a multi-plane coincident current core storage unit of the form described in the application of Henry W. Schrimpf, filed Jan. 25, 1957 which issued Aug. 17, 1965 as U.S. Patent No. 3,201,762. Access to the main memory from an associated control memory 12 is provided by a multi-stage main memory address register 14 which stores the address of the location of the main memory presently being referenced. Associated with the main memory address register 14 is an auxiliary register 16 into which the contents of the main memory address register 14 are transferred and thereafter incremented, decremented or permitted to be transferred therethrough unchanged. The modified contents of the auxiliary register 16 are returned to the control memory 12 via an input register 18 hereinafter referred to as the control memory local register.

The control memory 12 may be comprised of a coincident current memory of a well-known type; however, a preferred embodiment of the present invention employs a linear select, two-core-per-bit, storage element capable of storing sixteen, fifteen bit words. As such, each of the multi-position storage registers is capable of storing information pertinent to the sequencing of data and of the various program instructions. In this respect, all of the program instructions are processed through the control memory which aids in the selection, interpretation and execution of these in order.

Figure 2:
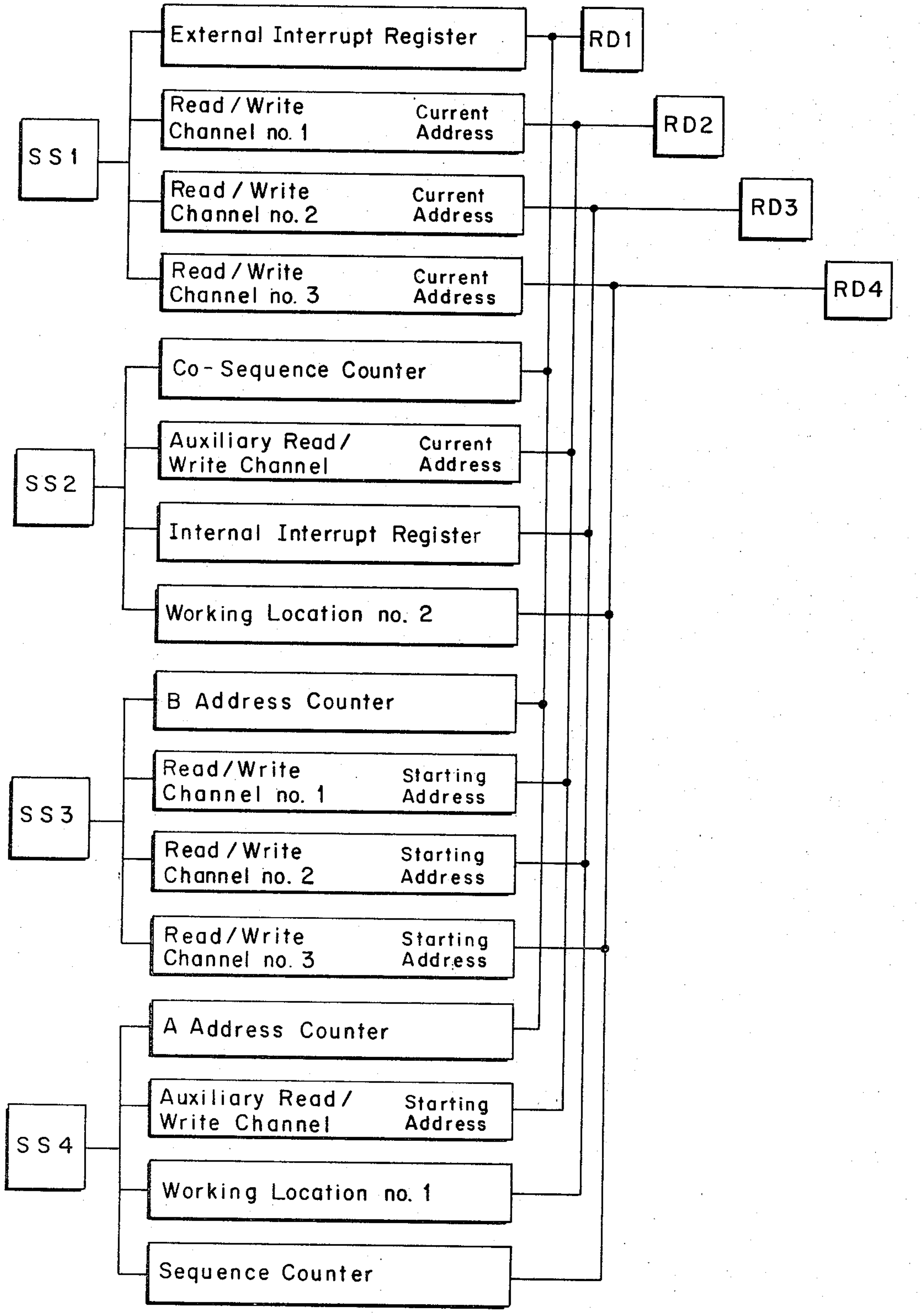
FIGURE 2 is a more detailed showing of a portion of the data processing apparatus disclosed in FIGURE 1.

As indicated in FIGURE 2, the control memory used in the preferred embodiment of the present invention comprises a plurality of special purpose registers including sequence and co-sequence registers; A and B address counters which may contain information identifying the main memory locations of the first of a series of characters comprising the operands specified by the instruction being executed; and, a plurality of working location registers used by the central processor during execution of an instruction for temporarily storing a main memory address, or possibly as a disposal area for unwanted information. In the implementation of the present invention, three working locations are provided, these are hereinafter referred to as working locations 1, 2 and 3. Additional special purpose registers of the control memory 12 are provided for storing information pertinent to the execution of other instructions. Included among these are starting and present location counters associated with each of a plurality of read/write channels utilized to communicate between main memory and a plurality of peripheral devices, not shown; and, external and internal interrupt registers to facilitate the interchange of operative routines without the further need of an instruction.

A plurality of storage registers comprising the control memory 12 are addressed through a control memory address register 20. The addressing circuitry will be dependent upon the type of information incorporated in the control memory 12 and for a coincident type of control memory may be of the form disclosed in the above-referenced Schrimpf patent. For the embodiment of FIGURE 2, all cores for a single location are threaded by two common wires, one for read and one for write. Four read/write drivers, designated RD1, RD2, RD3 and RD4 are logically positioned on one side of the stack of registers and four selector switches SS1, SS2, SS3 and SS4 are located on the other side. This arrangement permits the selection of a single location when only one read/write drive and one selection switch are activated.

Information may be transferred into the control memory from the auxiliary register 16 either via the main memory local register 18 or control memory sense amplifiers 21. Thus, unless inhibited, information transferred into the sense amplifiers 21 from the control memory 12 is automatically restored to its originating register or to whatever register the control memory address register 20 may reference during the current memory cycle. The logical gating structure associated with the inputs to the control memory 12 is such as enables the transfer of information on a bit basis from the control memory local register 18 and the control memory sense amplifiers 21 into the control memory address then being referenced by addressing means 20. This logical gating structure has the further ability to completely inhibit the introduction or restoration of information being directed to the control memory 12.

Referring now to a further consideration of the main memory 10, it should be noted that information is transferred therefrom via a plurality of conventional sense amplifiers 22. As indicated above, the preferred embodiment of the present invention is operative on a character basis with each character further comprising six informational and two punctuation bits in addition to a parity bit used for error checking purposes. FIGURE 1 illustrates the six information bits, bits 0 through 6, and two punctuation bits, bits 7 and 8, as entering the sense amplifiers 22 via separate paths. This manner of presentation merely amplifies the difference in the nature of the bits of information comprising a character.

As in the control memory, the main memory sense amplifiers 22 are capable of restoring to their original location in main memory, the bit representation being extracted therefrom. The bit representation registered in the main memory sense amplifiers 22 is also transferred into a main memory local register 24 which in addition to serving as a conduit for information entering and leaving main memory, also includes means, not shown, which serve to generate pertinent checking information on the data being brought into memory and rechecks the data as it is withdrawn. Information enters main memory 10 from a main memory local register 24 via conventional drivers 26, which transfer the contents of the main memory local register into the location being referenced by the main memory 14.

Scanning means 27 are shown connected to the output of the main memory local register 24. It is the function of the scanning means 27 to scan the contents of the location of main memory being referenced and generate an output signal upon detection of a particular bit representation. In one instance, the sensing of a particular one of the two punctuation bits 7 and 8 corresponding to a character of information currently being extracted, identifies that character as the high order digit of the divisor. For purposes of the present invention, the defining punctuation indicating the high order digit of an operand is denoted as a "word mark." The presence of a word mark is sensed by scanning means 27 which responds by generating an output signal to reset a conventional bistable device referred to herein as the first pass flop 28. The resetting of the first pass flop (FPF) indicates the completion of the first scan of the divisor. The significance of the state of the first scan flop 28 will become more readily apparent from an explanation of the operation of the system of FIGURE 1 which follows below.

Scanning means 27 is also capable of detecting the sign bits associated with the respective operands being processed. Since the numerical information processed in the preferred embodiment of the present invention is coded in a binary coded decimal representation, which in turn requires four bits to express each decimal's digit, the remaining two information bits of each six bit character are available for use as sign bits. The presence of either of these two bits is in turn detected by the scanning means 27 and a signal generated therein which is transferred to the clock and sequence cycle generator 46.

The arithmetic portion of the system embodying the present invention is basically composed of an adder 29 capable of performing both binary and decimal arithmetic. Two operand storage registers 30 and 32 are operatively connected to the input of adder 29 and provide means for storing characters of the A and B operands during the processing of program instruction. Information enters the A and B operand registers from the main memory local register 24. Included in the adder 29 is a carry function portion 34 which effects the selective combination of signal from corresponding stages of the A and B operand register 30 and 32 to thereafter generate carry signals in their respective stages thereof. This selective combination of signals is effected in accordance with control signals generated in means including the clock and sequence cycle generator 46 which is shown as being connected to the adder 29 through the subcommand decoder 48. It is the function of the sequence cycle generator 46 and subcommand decoder 48 to define the sequence of activities to be performed during the extraction and execution phases of each instruction and further establish the nature of the current operation as being logical or arithmetic in nature. The function and nature of operation of the sequence cycle generator and subcommand decoder should be more readily apparent from the detailed explanation of the system which follows.

Referring once more to FIGURE 1, output signals from corresponding stages of the A and B operand register 30 and 32 are combined with signals from a carry function portion in a sum register 36. The output of the sum register 36 is connected to a sum decoder 38 wherein the signal representation is recoded into decimal notation if the original representation was decimal, while for binary operations it may be allowed to pass through the decoder unchanged. The output of the sum register 36 is further connected to the input of a decimal carry decoder 40. The latter functions to detect a decimal carry condition and upon the detection thereof, responds by forcing a carry into the low order bit position of the carry function register 36. The output of the sum decoder 38 is transferred to the main memory local register 24 for subsequent storage in main memory.

Two additional registers 42 and 44 are shown as being connected to the main memory local register 24 and are provided for the purpose of storing the operation code and the operation code modifier respectively. The operation code, which will hereinafter be referred to more simply as the Op code, defines the fundamental operation to be performed by an instruction. The Op code modifier or variant character, is used to extend the definition supplied by the Op code. Outputs from the Op code register 42 and the Op code modifier register 44 are connected to the clock and sequence cycle generator 46 as well as the subcommand decoder 48.

As indicated above, it is the function of the sequence cycle generator 46 and the subcommand decoder 48 to generate the requisite control signals pertinent to the execution of a particular programmed instruction. In this respect, means are provided to connect the output of the sequence cycle generator 46 to the control memory address registers 20. When operative in its normal capacity, the sequence cycle generator is effective in setting up a multi-bit control memory address in the control memory address register 20 thereby identifying the lead instruction of a particular program being processed. As will be apparent to those skilled in the art, the processing of a particular program may also be initiated automatically by appropriate subsequencing brought about in another program or by branching orders which effect the desired transfer from one program to another. Circuitry for initiating an automatic transfer is discussed in the patent of Henry W. Schrimpf, which issued Apr. 10, 1962 as U.S. Patent No. 3,029,414.

In the preferred embodiment of the present invention, the processing of data and instructions proceeds on a character basis with a single character being transferred from main memory during each memory cycle. In any programmed operation, the first step is to remove from memory the next instruction to be processed. This portion of the opertaion is designated the extraction portion during which the characters defining the instruction are transferred one by one out of successive main memory locations into the various operational registers of the central processor. The extraction of an instruction is initiated with the contents of a location in main memory, as specified by the sequence register of the control memory 12, being transferred to the main memory address register 14. The contents of the main memory location being referenced by the main memory address register are transferred via the sense amplifiers 22 and the main memory local register 24 to the Op code register 42. Subsequently, the contents of the main memory address register 14 are transferred through the decrement-increment logic of the auxiliary register 16 and thereafter restored in the sequence register of control memory 12.

Since it is the Op code which defines the nature of the order currently being processed, the extraction of the Op code is determinative of the sequencing of successive steps. In this respect, a typical program instruction may include as few as one character or as many as ten or more depending upon the type of instruction and the mode of addressing. In accordance with the nature of operation of the preferred embodiment of the present invention, the Op code is actually brought out of main memory and deposited in the sequence register of control memory 12 during the termination of the extraction phase of the preceding instruction. More specifically, during the extraction phase of the processing of an instruction, each character is brought out of main memory in sequence until a character with an accompanying punctuation bit is detected. The detcetion of the punctuation bit identifies the last character read as the Op code of the next succeeding instruction and thus signals the termination of the extraction portion of the instruction. Once the processing of the previously extracted instruction is complete, the main memory address of the Op code of the succeeding instruction will be immediately available. The format of the present instruction is such that the extraction of the Op code is followed during succeeding available memory cycles by the extraction of characters of information which are loaded into the A and B address register of control memory 11.

For purposes of explanation, it will be assumed that the extraction portion of the present instruction has been concluded, and that during the extraction portion, the Op code will have been identified as that of a decimal divide instruction. The format of the decimal divide instruction is *F/A/B*. Thus, in addition to extracting and storing the Op code of F character in the Op code register 42, the A and B counters of control memory 12 will have been loaded with information defining the low order or units digit of the divisor and the high order digit of the dividend.

With the A and B counters loaded, the system is now ready to execute the decimal divide operation. The steps involved in the performance of the division operation are set out in the flowchart comprising FIGURE 3 which will be referred to along with the system of FIGURE 1 throughout the following explanation of operation. The interpretation of the flowchart depicted in FIGURE 3 will be facilitated by the following glossary which more fully expresses the logical functions expressed therein:

Cycles:
- STC: Set-up cycles
- LUB: Line-up B field cycles
- SUB: Subtraction cycles
- CFD: Check for divide cycles
- SBX: Store Borrow in X register
- STR: Store results cycle
- RND: Ready next divide cycle
- LTB: Locate tens bit of B field
- Add: Corrective-add cycles Conditions:
- FPF: First pass flop (set)
- NO7: Word mark in A (detected)
- WMA: Word Mark in A (stored)
- MDZ: Entire divisor zero
- ZFD: Zone bits found
- CFZ: Check for zeros
- XEZ: X register equals zero
- OVF: Overflow flop (set)

Figure 3:
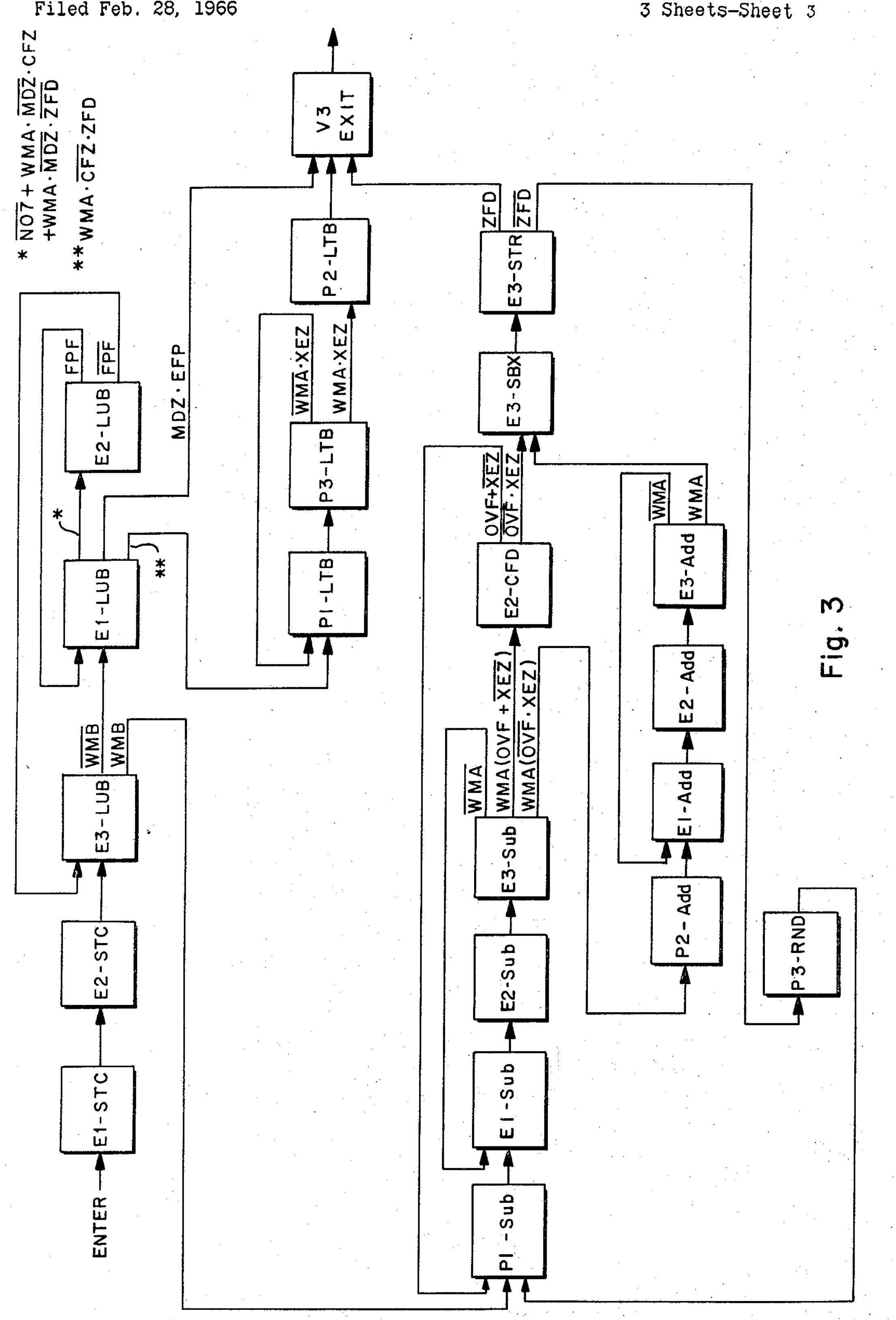
FIGURE 3 is a diagrammatic representation depicting the cyclical flowpath corresponding to the decimal divide instruction including the justification portion thereof.

The function of the above cycles as effected in accordance with the associated conditioning signals should become more meaningful after reference has been made to the explanation of the operation of FIGURE 1 in light of FIGURE 3.

The first cycles to be performed are the setup cycles STC. With the A counter sitting at the low order or unit position of the divisor, the contents thereof are transferred through the control memory sense amplifiers 21 during the cycle E1–STC and stored in working location 1 of the control memory 12 by means of an internal transfer.

The internal transfer is used on numerous occasions during the execution of the decimal divide instruction and upon each occasion is effective in saving a complete memory cycle. The internal transfer is accommodated by addressing control memory during a first memory cycle subinterval and transferring the contents of the referenced location into control memory sense amplifiers 21 for temporary storage therein. During this time, the control memory address register 20 is reset to a second address into which the information, then being stored in the sense amplifier 21, is thereafter transferred. The second of these setup cycles is the E2–STC cycle during which the contents of the B register of control memory 12, presently registering the main memory location of the most significant digit of the dividend, are transferred to working locations 2 and 3 of control memory 12.

With the setup of working locations 1, 2 and 3 complete, the next phase of the decimal divide operation is initiated. This phase of the operation directly concerns the subject matter of the present invention in that it constitutes the justification portion thereof. This portion of the operation is initiated with the E3–LUB cycle during which the contents of working location 3 are transferred to the main memory address register 14 and thereafter decremented in the auxiliary register 16 before being returned to working location 3 of control memory. During the course of this transfer, the original contents of working location 3 are decremented so that, as restored, they identify the main memory location immediately adjacent to that previously referenced. In accordance with the definition of the division operation, the then present contents of working location 3 correspond to the address of the separator space which lies between the dividend and quotient. The function of the separator space is to act as means for distinguishing between the locations allocated to the storage of the dividend and those allocated to storage of the quotient.

The next cycle to be performed is the E1–LUB cycle during which the main memory location specified by the A counter is referenced and the information therein is scanned by sensing means 27 for the presence of a word mark. This operation will be repeated for each digit of the divisor pending the detection of a word mark identifying the associated digit as the high order digit of the divisor. As each digit of the divisor is extracted and examined for the presence of a word mark, the contents of the A address counter of control memory 12 will be transferred via the main memory address register 14 to the auxiliary register 16 to be decremented before being returned to the A address counter.

Subsequent to the extraction and examination of each digit of the divisor, an E2–LUB cycle is initiated to effect the extraction and examination of a digit of the dividend commencing with the most significant digit thereof. The dividend digits are examined for the presence of sign bits to thereby identify the associated digit as the units digit or low order digit of the dividend. This latter operation also takes place in scanning means 27.

The failure to detect a sign bit in association with a referenced location of the B field initiates the restoration of an incremented version of the original contents of the B counter. The incrementation of the B counter is in preparation of the next E2–LUB cycle during which the succeeding digit of the B operand will be scanned. Prior to the restoration of the incremented version of the contents of the B counter, the original contents thereof are transferred to working location 2. During the justification operation, it is the function of working location 2, to register the B field location currently being referenced. Accordingly, during each successive scanning cycle of the B field, the then current contents of the B counter will be transferred into working location 2. During the balance of the justification operation, working location 2 will register a count which is always one less than that currently registered in the B counter. When the scanning operation is complete, the contents of working location 2 will be transferred into the B counter preparatory to the first subtraction cycle of the actual division operation.

The scanning operation continues with the alternate extraction and examination of divisor and dividend digits pending the detection of a word mark in the A field or a sign bit in the B field. The detection of a sign bit in the B field prior to the detection of a word mark in the A field indicates that the dividend is smaller than the divisor so that the result of the division operation will be less than one. In the preferred embodiment of the present invention, the detection of this latter condition makes unnecessary the actual division operation since fractional values are not recorded. However, the sign of the quotient must still be established.

The first step to be taken in establishing the sign of the quotient is to cycle through the remaining digits of the A field. After the end of the A field is found, the tens position of the result will be located. The first cycle is indicated in the flow diagram of FIGURE 3 as the P1–LTB cycle during which the contents of the A address register of control memory are transferred to the main memory address register 14. The contents of the referenced main memory location are thereafter examined in the scanning means 27. After each digit of the A field has been extracted and scanned and the contents of the A counter decremented, a P3–LTB cycle is initiated during which the B field is incremented in a corresponding manner.

The cycling through the A and B fields continues until the end of the A field is located. Once the length of the A field has been determined, the storage position of the sign in the quotient field is established in accordance with the equation:

$$Q_S = B_U - (N_A + 1)$$

The literal interpretation of the above equation is that the location for storing the sign is found by taking the memory location corresponding to the uppermost digit of the B field and subtracting therefrom the number of digits in the A field plus one. The operation of entering the sign bits into the quotient is completed in a P2–LTB cycle which is also used to reload the B counter of control memory with the address of the tens position of the quotient. This cycle is of further use in loading the A counter with the address of the A field word mark minus one; whereafter the division operation is discontinued by going into an exit or V3 cycle.

In the above explanation it has been assumed that the dividend is of smaller absolute value than the divisor thus leading to the curtailment of the actual division operation upon detection of this condition. Assume now that the divisor is of greater length than the dividend so that a work mark will be detected in the A field prior to the detection of a sign bit in the B field. Pending the detection of the word mark in the A field, the system will alternate between E1–LUB cycles and E2–LUB cycles. This mode of operation is satisfied by the conditioning signal FPF which corresponds with flip-flop 28 being in its set state pending the detection of the word mark. Upon detection of the word mark in the A field, the first pass flop 28 is reset. At this point in the operation, the A counter will register the main memory location of the high order digit of the divisor. The necessary cycling has occurred in the B field so that at this time the contents of the B counter represent the corresponding digital order as that of the low order digit of the divisor. Information defining the latter was originally stored in working location 1 and thus is now available to initiate the actual division operation by over-and-over subtraction.

It could have been that all of the digits sensed in the A field prior to the detection of a word mark were zeros. Thus, up until the digit with the associated word mark was detected, it would be impossible to tell whether the most significant digit of the A field had a real value. If upon sensing the high order digit of the divisor, it was ascertained that it too had a zero value, the operation would be identified as illegal and steps would be taken to abort any further operation in the decimal divide instruction. The flowchart of FIGURE 3 indicates the flowpath leading from the E1–LUB cycle directly to the V3 or exit cycle as being conditioned by the signals MDZ–EFP, the conditioning signal being in turn generated upon detection of all zero divisor.

Assume now that the most significant digit of the A field has been located and that it does have a real value. In this case, the justification phase of the present operation will be complete since corresponding orders of the divisor and dividend will have been identified. As indicated above, the contents of working location 1 and the current contents of the B counter will be used to identify the first digit involved in the actual division operation. If on the other hand, the low order digits of the divisor are real and are followed by a number of zeros in the high order positions, then although the divisor is legal, allowance will have to be made both with respect to the alignment of digits of the divisor and dividend, and also with respect to the positioning of the first quotient digit.

This latter alignment procedure is deemed to be a continuation of the original LUB, or line-up B field, portion of the present instruction. Thus, with the first pass flop 28 reset so as to generate the signal $\overline{FPF}$, a scan of the A and B fields in the reverse direction will be initiated. The first cycle is an E1–LUB ($\overline{FPF}$) cycle wherein a check is made for a zero in the most significant digital posittion of the A field. Since we have assumed for purposes of this explanation that the higher order positions of the A field do contain zeros, the detection of the first high order zero will initiate an incrementation of the contents of the A address counter of control memory. This is followed by a consequent decrementing of the contents of the B address counter and of working locations 2 and 3 during the succeeding cycles, designated in the flowchart of FIGURE 3 as the E2–LUB ($\overline{FPF}$) and E3–LUB ($\overline{FPF}$) cycles respectively. The alternate incrementing and decrementing of the contents of the A and B counters and of working location 3 continues in this manner pending the detection of the first real digit in the A field.

After alignment of the corresponding orders of the divisor and dividend digits has been effected, the contents of working location 1 are ready for transfer to the A counter for use in the actual subtraction operation. This readying operation occurs in cycle P2–SUB during which the A counter is loaded with the address of the divisors' units position as previously stored in working location 1, while the B counter is loaded with the address of the low order dividend character to be used in the first subtract operation, The latter information originating in working location 2. At this time working location 3 registers the main memory location of the first quotient digit.

In further explanation of the operation of the present invention consider the following example wherein the A operand contained in the A field and in turn comprises the information $\overline{1}$ 2 3 4+ 5. The sign of the A operand identifies the 5 as being positive in value and also identifies it as the low order digit of the operand. In a similar manner, the bar over the 1 identifies the latter as the most significant digit of the A operand.

In accordance with conventional storage techniques, with the low order digit of the A operand is stored in memory location 100, and the locations octally coded, the high order digit will occupy location 74.

The B field may comprise the information 0 0 0 0 0 0 9 8 7 6 5+ 4 and be contained in memory locations 205 through 172. In this respect the low order digit of the dividend is indicated as being stored in memory location 205 while the high order digit is stored in location 200. The locations 176→172 are reserved for the storage of the quotient digits, the latter being stored as they are generated. The quotient storage locations are separated from the B field by the separator space of location 177.

The following table sets out the contents of the various registers during the set-up and justification portions of the present instruction:

7 AC=100
↓ ↓
A Field: $\overline{1}$ 2 3 4+5

172 BC=200 205
↓ ↓ ↓
B Field: 0 0 0 0 0 0 9 8 7 6 5+4

| Cycle | Conditions | | AC | BC | WL1 | WL2 | WL3 |
|---|---|---|---|---|---|---|---|
| | FPF | $\overline{NO7}$ | 100 | 200 | X | X | X |
| $\overline{E1–STC}$ | ↓ | ↓ | | | 100 | | |
| E2–STC | | | | | | 200 | 200 |
| E3–LUB | | | | | | | 177 |
| E1–LUB | | | 77 | | | | |
| E2–LUB | | | | 201 | | 200 | |
| E1–LUB | | | 76 | | | | |
| E2–LUB | | | | 202 | | 201 | |
| E1–LUB | | | 75 | | | | |
| E2–LUB | | | | 203 | | 202 | |
| E1–LUB | | NO7 | 74 | | | | |
| E2–LUB | | | | 204 | | 203 | |
| E1–LUB | $\overline{FPF}$ | | 75 | | | | |
| E2–LUB | | | | 203 | | 204 | |
| E3–LUB | | | | | | | 176 |
| P2–SUB | | | 100 | 204 | | | |
| E1–SUB | (Next Cycle) | | | | | | |
| ↓ | | | | | | | |

In explanation of the above table, it may be said that the initial conditions find the first pass flop 28 set, and the A and B counters referencing memory locations 100 and 200 respectively. STC cycles are initiated to effect the transfer of the information in the A and B counters to working locations 1, 2 and 3. This in turn is followed by an E3–LUB cycle during which the contents of working location 3 are decremented to thereby represent the main memory location of the separator space.

Thereafter successive digits of the A and B operands are alternatively referenced pending the detection of either a word mark or sign bit. As indicated by the condition NO7, a sign bit is detected in conjunction with the high order digit of the divisor to effect the resetting of the first pass flop.

With the first pass completed, a reverse scan is initiated to locate the first digit of the A operand having a real value. This is immediately identified as the high order digit of the divisor. After decrementing the B counter, another E3–LUB cycle is initiated wherein the contents of working location 3 are decremented to thereby establish the address of the first quotient digit. The P2–SUB cycle is used to load the address of the units digit of the divisor, as identified by the contents of working location 1, into the A counter; while using the same cycle to load the corresponding digit of the dividend, as identified by the contents of working location 2, into the B counter. This completes the justification portion of the present instruction and the actual division operation is then ready to be initiated.

Assume now that the A and B fields have been aligned and that the pertinent control memory registers have been loaded; accordingly, the balance of the first subtraction cycle is executed in a conventional manner. In this respect, during cycle E1–SUB, the A operand register 30 is loaded with the character of information stored in the main memory location specified by the contents of the A counter. The next cycle is an E2–SUB cycle during which the B operand register 32 is loaded with the character of information stored in the main memory location as specified by the contents of the B counter. As soon as the A and B operand registers have been loaded, the actual subtraction operations on these characters are initiated.

During the succeeding cycle, i.e., cycle E3–SUB, the main memory address register 14 retains the digital representation as specified by the contents of the B counter during the immediately preceding cycle. As the first subtraction operation is completed, the remainder, resulting from the subtraction of the low order digit of the divisor from the corresponding digit of the dividend, assuming it is positive, is restored in the referenced main memory location. Assuming that the division operation was successful, the B counter is thereafter decremented to the address of the next dividend character. In this manner, subtraction is effected between corresponding digits of the divisor and dividend until a word mark in the A field is sensed. The detection of the word mark in the A field signals the completion of the first subtraction cycle, i.e. that the divisor has been subtracted from the dividend.

An arithmetic check is initiated in the E3–SUB after the completion of each subtraction operation and is effected by a conventional overflow check. The presence of an overflow condition indicates that an attempted subtraction was unsuccessful. In the absence of an overflow, the processing continues pending the detection of the word mark, whereafter the value of the divisor must be added back to the dividend. This latter operation is effected in the course of a corrective add cycle, whereafter the divisor is realigned one position to the right with respect to the numerical representation of the dividend, and a subtraction cycle is then reinitiated.

The corrective-add cycle is effected in a manner analogous to that of a subtraction cycle and occurs during the cycle's P2–ADD, E1–ADD, E2–ADD and E3–ADD.

More specifically, during the P2–ADD portion of a corrective-add cycle, the A counter is reloaded with the address of the units portion of the A field. Similarly, the B counter is loaded with the address of the rightmost dividend character used during the immediately preceding subtraction cycle. During the E1–ADD cycle, the A operand register 30 is loaded for the current corrective-add cycle and during the E2–ADD cycle, the B operand register 32 is loaded whereafter the addition operation is initiated. As corresponding digits are added, a check is made to identify the last digit of the A field in the manner indicated above. During the E3–ADD cycle of each corrective-add cycle, the B counter is decremented to the address of the next character and the system then loops back to the E1–ADD cycle to perform the next phase of the corrective-add operation.

During the course of each subtraction operation, the divisor digit is scanned to sense the presence of a word mark thus identifying the high order digit of the divisor. If a word mark is detected in the A field, the contents of the A operand register are retained and an attempt is made, during a cycle CFD, to again subtract the high order digit of the divisor from the corresponding digit of the B operand. If the attempted subtraction is successful, it indicates that another pass at subtraction should be effected using the current characters of the divisor and dividend. Accordingly, the operation reverts to an additional subtraction cycle which is initiated in a conventional manner beginning with the cycle P2–SUB. Each successful subtraction cycle results in the incrementation of a temporary storage register, not shown; which will, upon realization that no further subtraction cycle can be effected with the current characters of the divisor and dividend, be transferred into the main memory location identified by the current contents of working location 3.

After the CFD cycle, or corrective-add cycle has been completed, an E3–SBX cycle is initiated wherein the remainder of the last subtraction operation is stored in a special register, not shown. The purpose of the SBX cycle is to store off in the special register the remainder left in the high order position of the dividend after the last possible successful subtraction cycle has been effected between the divisor and the digits of the dividend presently being worked with. More specifically, after it has been established that the remainder from the digits of the dividend has been diminished to a point where the divisor is no longer divisible therein, the contents of working location 2 will be incremented to establish the new low order digit of the dividend from whence the corresponding digit of the divisor is to be subtracted. This in turn means that the main memory location containing the previously referenced high order digit of the dividend will no longer be referenced. Accordingly, the information remaining therein must be transferred to a register where it will be accessible during the course of the succeeding subtraction cycle leading to the generation of the next lower order quotient digit. In the present instance, the storage function is served by the special register which will be jointly referenced during that portion of the succeeding subtraction cycle during which the high order digit of the divisor is being subtracted from the corresponding order of the dividend.

The SBX cycle is followed by an E3–STR cycle during which the previously generated results are stored in the locations of the B field reserved for the quotient. In this respect, the contents of the temporary storage register, mentioned above, which is incremented after each successful subtraction cycle, is entered into the main memory location specified by the contents of working location 3. Thereafter the temporary storage register is reset and the contents of working location 3 are incremented to identify the main memory storage location of the quotient digit to be used in the succeeding subtraction cycle.

The store results cycle is followed by a P3–RND cycle preparatory to the next divide operation. During this latter cycle, the dividend is effectively shifted one digit to the right through modification of the contents of working location 2. If during the course of the E3–STR cycle, a signal is sensed indicating that zone bits were found during the current subtraction operation, the results of the preceding subtraction cycle would be stored and the operation deemed to be complete.

It will be apparent to those skilled in the art that other system configurations may well be incorporated within the principles of the present invention so long as the general operating characters are maintained compatible with the principles set forth in connection with the operation of FIGURE 1.

While in accordance with the provisions of the statutes, there have been illustrated and described the best forms of the invention known, certain changes may be made in the apparatus described without departing from the spirit of the invention as set forth in the appended claims, and that in some cases, certain features of the invention may be used to advantage without a corresponding use of other features.

Having now described the invention, what is claimed as new and novel and for which it is desired to secure by Letters Patent is:

1. A data processing apparatus including the combination comprising an addressable main memory for storing a plurality of characters of information including both divisor and dividend operands, a control portion operatively connected to said addressable main memory, said control portion including a first register initially storing the main memory address of the low order digit of the divisor, a second register for storing the main memory address of the high order digit of the dividend, scanning means connected to the output of said addressable main memory to alternately scan the contents of main memory locations referenced by said first and second registers and to sense for the presence of punctuation defining a particular digit as the high order digit of the divisor, and means connected to said scanning means and adapted in the absence of said defining punctuation to increment one of said first and second registers while decrementing said other one of said first and second registers, said last-named means being further operative upon detection of said defining punctuation to thereafter initiate the actual division operation by the method of over-and-over subtraction.

2. In a character-oriented data processing apparatus for effecting arithmetic operations therein, the combination comprising an addressable memory store for storing both information and program instructions, said addressable memory store further comprising addressing means connected to the input thereof and output means connected to register the contents of a memory location referenued by said addressing means, scanning means associated with the output of said memory store for sensing the contents of a referenced location therein and for generating control signals upon detection of predetermined punctuation bits stored in the memory address being referenced, control means connected to the input of said addressable memory store, said control means further comprising a plurality of registers including a first register initially storing a memory store address of the low order digit of the first operand to be used in said arithmetic operation, a second register initially storing the memory store address of the high order digit of a second operand to be used in said arithmetic operation, and means operative after each memory referencing operation and in the absence of a signal from said scanning means indicating the presence of said defining punctuation in said address being referenced to decrement the contents of said first register and increment the contents of said second register, said memory referencing and output scanning operations continuing until said defining punctuation is detected in association with a digit of said first operand to thereby identify corresponding orders of said first and second operands to be used to initiate said arithmetic operation.

3. In an arithmetic unit, the combination comprising a memory store including a plurality of addressable memory locations, said addressable memory store further comprising addressing means connected to the input thereof to receive a count representing an address location in said addressable memory to be referenced and output means connected to the output of said addressable memory to register the contents of the memory location referenced by said addressing means, a first counter initially registering a count corresponding to the memory storage location of the least significant digit of a first operand, a second counter initially registering a count corresponding to the memory storage location of the most significant digit of a second operand, means for alternately transferring the count registered in said first and then said second counter into said addressing means and thereafter decrementing the count in one of said first and second counters while incrementing the count in the other of said first and second counters, scanning means connected to the output portion of said addressable memory for scanning the contents of each memory location referenced therein, said alternate decrementing and incrementing continuing until said scanning means indicates that said first counter registers a count corresponding to the storage location of the most significant digit of said first operand whereupon the current count of said second counter and the original count of said first counter are used to identify storage locations of corresponding orders of digits of said first and second operands to be manipulated in said arithmetic unit.

4. In a character-oriented fixed point arithmetic apparatus for performing division operations by the technique of over-and-over subtraction including means for aligning corresponding orders of digits of first and second operands preliminary to the initiation of the over and over subtraction operations, the combination comprising, a memory store including a plurality of addressable locations each of which stores at least one digit of one of said first and second operands, said memory store further comprising addressing means connected to the input thereof and adapted to reference any one of said plurality of addressable locations therein and output means adapted to register the contents of each memory location referenced by said addressing means, control means operatively connected to said addressing portion of said memory store for selectively referencing the addresses in said memory store of said first and second operands, said first means further including means including scanning means for counting the number of digits in said first operand, and means operative to modify the effective address of said second operand by a number equal to the number of digits in said first operand.

5. In a character-oriented data processing apparatus for performing division operations by the technique of over-and-over subtraction, the combination comprising an addressable memory store, said memory store further comprising addressable means connected to the input portion thereof to reference any location therein and output means adapted to register the contents of each memory location referenced by said addressing means, a first register for storing the memory store address of a first binary coded operand to be used in said division operation, a second register for storing the memory store address of a second binary coded operand to be used in said division operation, means selectively connecting said first and second registers to said addressing portion of said memory store, means including scanning means connected to the output portion of said memory store and adapted to sense for a particular bit representation in the information registered therein, means operative in response to a signal initiating said division operation to effect justification operation whereby preliminary to the initiation of an actual subtraction operation respective digits of said first operand are aligned with respective digits of said second operand, said justification operation being effected by scanning means alternately transferring the contents of said first and then said second register into said addressing means and for scanning the contents of the memory store addresses established thereby and in the absence of defining punctuation associated with the information stored therein for decrementing the contents of said first register and incrementing the contents of said second registers, and means operative upon detection of said particular bit representation stored in the memory store address specified by a particular one of said first and second registers for initiating said over-and-over subtraction operations.

6. Apparatus for the alignment of corresponding orders of digits of divisor and dividend operands preliminary to the initiation of over and over subtraction in a division operation, comprising the combination of an addressable memory store having addressing means associated with the input thereof to reference any location therein and output means connected to register the contents of each memory location referenced by said addressing means, scanning means connected to the output of said addressable memory store for scanning the contents of the memory location currently being referenced and for generating a control signal upon detection of predetermined punctuation bits located therein, control means connected to said addressing portion of said addressable memory store, said control means further comprising a plurality of registers including a first register initially storing the address in memory of the low order digit of the divisor operand, a second register initially storing the address in memory of the high order digit of the dividend operand, a third register for storing the initial contents of said first register, means responsive to a command to initiate said alignment operation to alternately transfer the contents of said first and then said second register into said addressing portion of said addressable memory store, and means operative in the absence of a signal from said scanning means indicating the presence of said defining punctuation in a main memory address corresponding to a digit of the divisor or dividend operands to decrement the contents of said first register and increment the contents of said second register, whereby said routine of referencing said memory alternately by said first and then said second register and the subsequent incrementation and decrementation of the contents of said first and second registers continues until said defining punctuation is detected in association with said first register to thereby identify the contents of said second and third registers as representing corresponding orders of digits of said dividend and divisor operands, or alternatively the detection of defining punctuation in the main memory address associated with said second register establishes the quotient as being fractional in nature thus aborting the over and over subtraction operation.

7. In a data processing apparatus adapted to effect an arithmetic operation in accordance with program instructions stored therein, the combination comprising an addressable memory store having addressing means connected to the input thereof to reference any location therein and output means connected to register the contents of each memory location referenced by said addressing means, scanning means connected to the output of said addressable memory store for scanning the contents of the memory location currently being referenced and for generating control signals in response to the detection of defining punctuation stored therein, control means connected to the addressing portion of said addressable memory store, said control means further comprising a plurality of registers including a first register for storing the address in memory of the low order digit of a first operand, a second register for storing the address in memory of the high order digit of a second operand, further registers selectively connected to said first and second registers and adapted to store the original contents thereof, increment-decrement means alternatively effective in incrementing or decrementing the contents of said plurality of control memory registers as selectively transferred thereto, said last-named means being operative in the absence of said control signal from said sensing means indicating the presence of said defining punctuation in a location of said addressable memory store corresponding to a digit of said first or second operands to decrement the contents of said first register and increment the contents of said second register, which process continues until said defining punctuation is detected in association with the memory location identified by said first or second registers, bistable means connected to the output of said scanning means, said bistable means being set to a first state upon initiation of the current instruction and reset to a second state by said control signals generated upon detection of said defining punctuation in association with the contents of the memory location identified by said first register, and means including said control means operative upon resetting of said bistable means to initiate a rescanning of those positions of said addressable memory store previously referenced by the contents of said first register, said rescanning operation continuing pending the detection of a digit having a real value as being located therein, said increment-decrement means being effective during each cycle of said reverse scanning operation to increment the contents of said first register and to decrement the contents of said second register and at least one of said further registers, and means operative upon the sensing of the first real digit in said memory location identified by the contents of said first register to halt further incrementing and decrementing operations and thereby identify the contents of said second register as the location in said addressable memory store of the digit of said second operand corresponding to the low order digit of said first operand and the contents of said at least one of said further registers as identifying the main memory location for storing the result of a first arithmetic operation to be performed on the low order digit of said first operand and the corresponding order of said second operand.

References Cited

UNITED STATES PATENTS

| | | | |
|---|---|---|---|
| 3,077,580 | 2/1963 | Underwood | 340—172.5 |
| 3,182,180 | 5/1965 | Keir | 235—164 |

OTHER REFERENCES

IBM 1401 Data Processing System Reference Manual, A24–1403–5, April 1962, pages 75 and 76, pages 166 and 167.

MALCOLM A. MORRISON, *Primary Examiner.*

V. SIBER, *Assistant Examiner.*